April 2, 1968  H. H. WOOD  3,376,208
METHOD OF IMPROVING THE ADHESIVE PROPERTIES OF POLYOLEFIN
FILM BY PASSING A DIFFUSE ELECTRICAL DISCHARGE
OVER THE FILMS SURFACE Filed May 19, 1965  2 Sheets-Sheet 1

INVENTOR,
HERBERT HOLDEN WOOD

AGENT

April 2, 1968

H. H. WOOD 3,376,208

METHOD OF IMPROVING THE ADHESIVE PROPERTIES OF POLYOLEFIN
FILM BY PASSING A DIFFUSE ELECTRICAL DISCHARGE
OVER THE FILMS SURFACE

Filed May 19, 1965

INVENTOR,
HERBERT HOLDEN WOOD

AGENT

United States Patent Office 3,376,208
Patented Apr. 2, 1968

3,376,208
METHOD OF IMPROVING THE ADHESIVE PROPERTIES OF POLYOLEFIN FILM BY PASSING A DIFFUSE ELECTRICAL DISCHARGE OVER THE FILM'S SURFACE
Herbert H. Wood, St. Hilaire, Quebec, Canada, assignor to Canadian Industries Limited, Montreal, Quebec, Canada, a corporation of Canada
Filed May 19, 1965, Ser. No. 456,950
Claims priority, application Great Britain, May 19, 1964, 20,584/64
7 Claims. (Cl. 204—168)

ABSTRACT OF THE DISCLOSURE

Polyolefine surfaces are rendered more receptive to printing inks, adhesives and the like by passing the surface tangentially through an elongated corona discharge. The discharge, which may be direct current or alternating current, does not pass through the polyolefine and as a result possible puncturing of the polyolefine is avoided.

---

This inventon relates to the treatment of the surfaces of polyolefine resins and more particularly to the treatment of the surfaces of polyolefine sheet material to render said surfaces more receptive to printing inks, adhesives and the like.

Polyethylene has been used extensively in packaging applications because of its advantages of light weight, toughness and inertness. However, it has been found that the surface of polyethylene has poor receptivity for adhesives and surface coatings such as printing inks. Usually, when printing ink is applied to the surface of polyethylene, it does not adhere and may be rubbed off easily. It is known to treat polyethylene film to improve its receptivity to printing inks by passing the film between electrodes between which a corona discharge is maintained. Commonly, one of the electrodes is a metallic roll coated with an insulating layer. Since the corona discharge passes through the insulating layer on the roll, this layer tends to puncture and requires frequent replacement.

It has now been found that the surface of polyolefine articles such as film and the like can be made more receptive to printing inks, adhesives and the like by passing the polyolefine surface through an electrical discharge maintained between two electrodes, both electrodes being located on the same side of the polyolefine surface. The novel method treats one surface only of the article. Since the electrical discharge does not pass through an insulating coating on a film supporting roll, there is no likelihood of punctures of the roll coating being caused by the electrical discharge.

It is therefore an object of this invention to provide a novel method for polyolefine surfaces receptive to printing inks, adhesives and the like. An additional object is to provide a novel method for rendering polyolefine surfaces so receptive by treatment with a high voltage electrical discharge. Additional objects will appear hereinafter.

The novel method of the invention comprises forming an elongated electrical discharge between two electrically conducting electrodes, said discharge traversing a gaseous medium only, and passing a polyolefine surface through the said electrical discharge, the surface entering into and issuing from the discharge on the same side thereof.

The treatment of this invention can be conveniently carried out with the apparatus illustrated in the accompanying drawings wherein.

Figure 1:
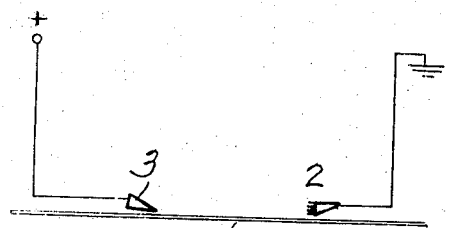
FIGURE 1 is a diagrammatic view of two electrodes adjacent to a length of polyolefine film.

Referring now to FIGURE 1, at 1 is shown a strip of polyolefine film which may be moving in either direction. 2 and 3 indicate electrodes, between which an electrical discharge is developed by applying a potential difference between them. Electrode 2 has a large number of points disposed along its edge such as a comb or saw blade in order to enhance the discharge. Electrode 3 is a conducting knife edge with the sharp edge in close proximity to the film. The electrical discharge between the two electrodes may be brought about by the passage of either direct current or alternating current. When using direct current, either electrode may be positive but it is found that improved treatment is obtained when electrode 2 is the positive electrode and electrode 3 is at negative potential. The degree of treatment is dependent upon the speed at which the film passes through the electrical discharge. The degree of treatment is reduced as the transport speed is increased.

Figure 2:
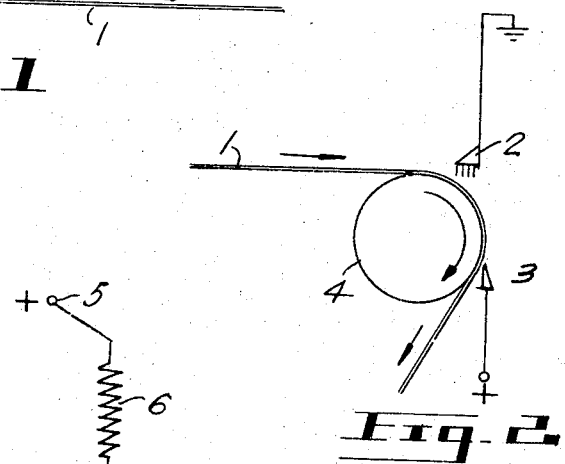
FIGURE 2 is a diagrammatic view showing the use of a roll to carry the polyolefine film through the electrical discharge.

In FIGURE 2 is shown an embodiment of the invention in which a turning roll 4 is used to more effectively introduce the film between the electrodes. In this manner a more effective treatment of the film is obtained. Roll 4 may be non-conducting since it does not aid in the conductance of the charge between the two electrodes.

Figure 3:
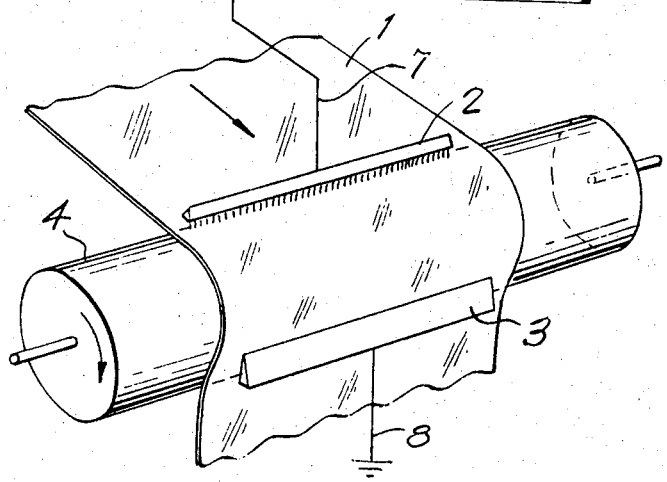
FIGURE 3 is a diagrammatic perspective view of an apparatus suitable for carrying out the treatment of this invention.

In the embodiment of the invention shown in FIGURE 3, the film 1 is illustrated as passing over the roll 4, thus coming between the two electrodes 2 and 3 between which high tension electrical discharge is passing. At 5 is shown the connection to a source of high voltage electric power, the other terminal of the high voltage source being grounded. The electric current passes through the current limiting resistor 6 which is connected by the cable 7 to the electrode 2; electrode 3 is connected through cable 8 to ground. Roll 4 is non-conducting.

Figure 4:
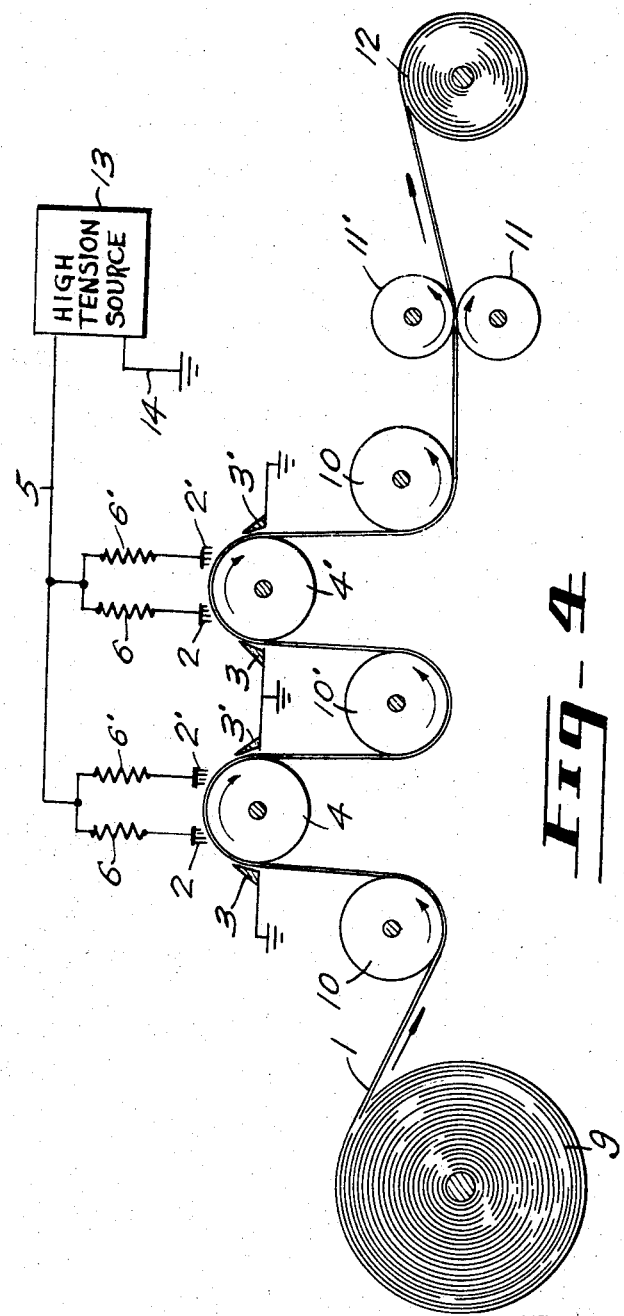
FIGURE 4 is a diagrammatic side elevation of an apparatus employed for treatment of film by the method of this invention.

In the film treating apparatus shown in FIGURE 4, the film 1 is taken from the roll 9 and directed over the treater rolls 4 and 4' by the guide rolls 10 and 10'. The film is drawn through the treating zone by the nip rolls 11 and 11' and stored on the mechanical wind up 12. In this embodiment the treating electrodes 2 and 3 are employed in pairs (2 and 2'; 3 and 3') for each treating roll. Power from the high tension source 13 is connected by the cable 5 and limiting resistors 6 and 6' to electrodes 2 and 2' which are in brush form The knife type electrodes 3 and 3' are grounded. At 14 is shown the ground connection of the power source. The rolls 4, 4', 10, and 10' are electrical non-conductors.

The electrical discharge employed in the treating method of this invention is characterized by the presence of a luminous corona. However, it has been observed that the effectiveness of the treatment increases with increasing voltage of the electrical discharge and that under conditions of maximum effectiveness the corona discharge is accompanied by sparking. Therefore the electrical discharge employed is correctly described as a corona and spark discharge.

In carrying out the treatment of film by this invention, the polyolefine film is passed through the electrical discharge which is developed between the electrodes. The speed for passage of the film between the electrodes will be determined by the degree of treatment required. The slower the film passes through the discharge the greater the treatment. However, at very slow speeds the film may suffer damage. It has been found that using a direct current source, a voltage as high as 100,000 volts and current as high as 5 milliamperes can be employed. When alternating current is employed, a voltage as high as 60,000 volts RMS at 60 c.p.s. is satisfactory. It is of advantage to employ frequencies greater than 60 c.p.s. when treating fast moving film. With alternating current the treatment is intermittent and the evenness of the treatment is increased as the frequency of the current increases. Frequencies as great as 3,000 c.p.s. or higher can be employed in the method of this invention. It is necessary to adjust the position of the electrodes with respect to the film so that the film passes through the electrical discharge. When the embodiment shown in FIGURE 1 is employed the adjustment of the electrodes is critical. However, when a roll is employed for the transport of the film, as shown in FIGURES 2, 3 and 4, greater latitude in electrode adjustment is possible. An electrode separation of 2 inches is satisfactory in this latter case for voltages of 60,000–80,000 volts D.C.

Numerous types of electrodes may be employed. As mentioned hereinbefore, the electrodes may be in the form of knife edges, brushes or combs. It has also been found that the use of a heated wire as an electrode gives a better electrical discharge. It is believed that this is due to the electron emission from the heated electrode.

It is envisaged that this method of treating polyolefine material may be applied to the surface of rounded objects such as polyolefine bottles. In this case, it will be necessary to rotate the polyolefine object so that its surface passes through the electrical discharge. For this purpose, the polyolefine object may be placed upon a rotating table and the electrodes positioned so that the rotating surface of the polyolefine object passes through the electrical discharge.

The method of this invention has the advantage that only one side of the polyolefine film is treated. This has the result that in printing operations the reverse side of a film is not ink receptive and therefore offsetting is minimized. In addition, since the electric current does not pass through the film, the chance of formation of pin-holes is also minimized.

The surface treatment of this invention improves the receptive properties of polyolefine surfaces for printing inks, paints, lacquers and adhesives.

It is to be understood that when carrying out the method of this invention, the voltage employed, the spacing of the electrodes, and the speed of passage of the polyolefine through the electrical discharge must be adjusted to obtain the desired degree of film treatment. These operating factors are interdependent so that for example, at higher current densities the film speed would have to be increased to obtain the same degree of treatment as when lower current densities were employed.

The invention is additionally illustrated by the following examples.

EXAMPLE 1

Employing the apparatus illustrated in FIGURE 4, a length of polyethylene film 6 inches in width and 8 mils in thickness was treated. In this case the rolls 4 and 10 were of glass tubing of 3¼ inches outer diameter. A voltage of 80,000 volts direct current at a current of 4 milliamperes was employed. The limiting resistors 6 were of 10 megohms resistance. The spacing between electrodes 2 and 3 across which the discharge occurred was 2½ inches in each case. The film was run through the treating zone at a linear speed of 70 feet per minute. During the treatment the apparatus was placed under a ventilating hood in order to remove any noxious gas that might be formed by the high voltage electrical discharge.

When the film so treated was coated with a layer of printing ink, the ink after drying could not be removed by stripping with a piece of pressure sensitive tape (Scotch tape). However, when printing ink was placed on an untreated portion of the same film and dried it could easily be stripped off with pressure sensitive tape.

EXAMPLE 2

Employing the apparatus used in Example 1, with the exception that a high voltage alternating current source providing 5 milliamperes at 50,000 volts 60 c.p.s. was substituted for the direct current power source, a length of polyethylene film 6 inches wide and 8 mils in thickness was treated at a speed of 70 feet per minute.

The treated film was coated with printing ink which was dried. Using pressure sensitive tape (Scotch tape), an attempt was made to strip off the dried ink but the ink adhered to the polyethylene film. However, using the same test procedure ink could be readily stripped from an untreated portion of the same film.

EXAMPLE 3

An apparatus as shown in FIGURE 4 was provided with a high tension source comprising a 115 volt, 400 c.p.s. motor-driven A.C. generator feeding a 115/60,000 volt step up transformer. The electrodes thus were energized by 400 c.p.s. alternating current at a potential of 60,000 volts. The limiting resistors 6 were 10 megohm resistors immersed in transformer oil. The spacing between electrodes 2 and 3 across which the discharge occurred was 2¾ inches.

A length of polyethylene film 6 inches in width and 8 mils in thickness was run through the treating zone of the apparatus at a linear speed of 80 feet per minute while being subjected to a discharge generated by alternating current of 400 c.p.s. at a potential of 60,000 volts. A ventilating hood was employed to remove any noxious gas resulting from the electrical discharge.

The treated film was coated with a layer of printing ink which was allowed to dry. The dried ink layer could not be removed by stripping with a piece of pressure sensitive tape (Scotch tape). However, dried printing ink could be stripped from an untreated portion of the same film using pressure sensitive tape.

What I claim is:
1. A method for rendering a surface of a polyolefine film more receptive to printing inks, adhesives and the like which comprises:
  supporting the film with an electrically non-conducting support member positioned to support the film tangentially to the discharge path between two spaced electrically conducting electrodes,
  moving the supported film over the support member tangentially to the discharge path between the electrodes, both electrodes lying on the same side of the film,
  adjusting the spacing between the electrodes and the potential difference therebetween so as to maintain an elongated electrical discharge between the electrodes independent of the motion of the film and when the film is stationary, said discharge being in contact with the film surface but traversing a gaseous medium only.
2. A method as claimed in claim 1 wherein the polyonefine is polyethylene.
3. A method as claimed in claim 1 wherein the electrical discharge is caused by the passage of alternating current between the electrodes.
4. A method as claimed in claim 3 wherein the alternating current employed has a frequency between 60 c.p.s. and 3,000 c.p.s.
5. A method as claimed in claim 1 wherein the electric current causing the electrical discharge has a potential between 20,000 and 100,000 volts.
6. A method as claimed in claim 1 wherein the electrical discharge is a corona discharge.
7. A method as claimed in claim 1 wherein the support member is an electrically non-conducting rotatable roll.

No references cited.

ROBERT K. MIHALEK, *Primary Examiner.*